US011495402B2

(12) United States Patent
Loth et al.

(10) Patent No.: US 11,495,402 B2
(45) Date of Patent: Nov. 8, 2022

(54) DEVICE AND METHOD FOR PRODUCING TRANSFORMER CORES

(71) Applicant: HEINRICH GEORG GMBH MASCHINENFABRIK, Kreuztal (DE)

(72) Inventors: Volker Loth, Freudenberg (DE); Jost Friedrich, Hilchenbach (DE)

(73) Assignee: HEINRICH GEORG GMBH MASCHINENFABRIK, Kreuztal (DE)

( * ) Notice: Subject to any disclaimer, the term of this patent is extended or adjusted under 35 U.S.C. 154(b) by 0 days.

(21) Appl. No.: 16/636,208

(22) PCT Filed: Aug. 9, 2018

(86) PCT No.: PCT/EP2018/071687
§ 371 (c)(1),
(2) Date: Feb. 3, 2020

(87) PCT Pub. No.: WO2019/030349
PCT Pub. Date: Feb. 14, 2019

(65) Prior Publication Data

US 2020/0373085 A1 Nov. 26, 2020

(30) Foreign Application Priority Data

Aug. 10, 2017 (DE) ..................... 10 2017 007 548.4

(51) Int. Cl.
*B23P 19/00* (2006.01)
*H01F 41/02* (2006.01)
(Continued)

(52) U.S. Cl.
CPC ......... *H01F 41/0233* (2013.01); *B21C 47/18* (2013.01); *B21D 28/02* (2013.01);
(Continued)

(58) Field of Classification Search
CPC ............ H01F 41/0213; H01F 41/0233; Y10T 29/49002; Y10T 29/5317; Y10T 29/53435; B21D 28/02; B21D 43/11
(Continued)

(56) References Cited

U.S. PATENT DOCUMENTS 4,578,860 A 4/1986 Tanaka
2020/0373085 A1* 11/2020 Loth .................. H01F 41/0213

FOREIGN PATENT DOCUMENTS

CN 103280308 A 9/2013
CN 104670937 A 6/2015
(Continued)

*Primary Examiner* — Thiem D Phan
(74) *Attorney, Agent, or Firm* — Dickinson Wright PLLC; Andrew D. Dorisio

(57) ABSTRACT

The invention relates to a device (11) and a method for producing transformer cores (12), the device comprising a retaining system (19) having a stacking table (18) for collecting sheets of metal (16) from which a transformer core (12) is constructed and having at least two positioning aids for the sheets, the stacking table forming a positioning surface (26) for the positioning aids and being equipped with the positioning aids, the stacking table and the positioning aids being realized such that a free positioning and a location-independent fastening of the positioning aids within the positioning surface is possible, the device having a positioning system (25) by means of which the positioning aids can be disposed on and/or be removed from the stacking table.

24 Claims, 3 Drawing Sheets

(51) Int. Cl.

| | |
|---|---|
| ***H01F 27/245*** | (2006.01) |
| ***H01F 27/26*** | (2006.01) |
| ***B21D 28/02*** | (2006.01) |
| ***B21C 47/18*** | (2006.01) |
| ***B65H 16/02*** | (2006.01) |

(52) U.S. Cl.
CPC ......... *B65H 16/023* (2013.01); *H01F 27/245* (2013.01); *H01F 27/26* (2013.01); *H01F 41/0213* (2013.01); *B65H 2301/5151* (2013.01); *B65H 2701/173* (2013.01); *Y10T 29/5317* (2015.01)

(58) Field of Classification Search
USPC ... 29/738, 564.4, 596, 598, 602.1, 604, 609, 29/729
See application file for complete search history.

(56) References Cited

FOREIGN PATENT DOCUMENTS

| | | | |
|---|---|---|---|
| DE | 4338981 | A1 | 6/1994 |
| DE | 10332018 | B3 | 1/2005 |
| EP | 2660836 | A2 | 11/2013 |
| JP | S518520 | A | 1/1976 |
| JP | H11345730 | A | 12/1999 |
| JP | 2001167962 | A | 6/2001 |
| JP | 2002100521 | A | 4/2002 |
| JP | 2003062692 | A | 3/2003 |
| JP | 2009076892 | | 4/2009 |
| JP | 2013211504 | A | 10/2013 |
| JP | 2015199079 | A | 11/2015 |
| JP | 2018510783 | A | 4/2018 |
| KR | 20160140272 | A | 12/2016 |
| WO | 9217890 | A1 | 10/1992 |

* cited by examiner

DEVICE AND METHOD FOR PRODUCING TRANSFORMER CORES

TECHNICAL FIELD OF THE INVENTION

The invention relates to a device and a method for producing transformer cores, the device comprising a retaining system having a stacking table for collecting sheets of metal from which a transformer core can be constructed and having at least two positioning aids for the sheets of metal, the stacking table forming a positioning surface for the positioning aids and being equipped with the positioning aids.

BACKGROUND OF THE INVENTION

The installations known from the state of the art for producing transformer cores are constructed according to a progress sequence in such a manner that sheets of metal for transformers first are cut from sheet-metal strips by means of a cutting device. The sheet-metal strips are stored on a steel-strip roll which is held by a reel head of a reel. The reel can have a plurality of reel heads having steel-strip rolls so that different sheet-metal strips of the cutting device can be supplied as required. The sheet-metal strips can be exchanged at or supplied to the cutting device manually or via a conveyor belt, for example; however, the exchange of the sheet-metal strip and/or the steel-strip roll requires much time.

The sheets of metal cut in the cutting device can have different geometries since a transformer core is often constructed from sheets of metal of different shapes. The sheets of metal can be guided away from the cutting device by a conveyor belt and be stored and/or stacked for further processing. The transformer core is constructed from the sheets of metal on a so-called stacking table. On the stacking table, threading bolts and/or sheet-metal abutments are mounted in a fixed manner as positioning aids and the sheets of metal are constructed and/or stacked on the threading bolts and/or sheet-metal abutments to construct the transformer core. In order to be able to locate the sheets of metal, at least two positioning aids are always required. The sheets of metal in particular have bores and/or cutouts in which the threading bolts can engage. The sheets of metal are stacked on threading bolts and/or stacked along the sheet-metal abutments and thus accurately positioned in relation to one another. Sheets of metal can generally be stacked manually but also in an automated manner. It is essential that a sufficient number of different sheets of metal is made available at all times for constructing the transformer core so as to avoid standstills, for example.

Since the stacking table is always constructed for a transformer core having a position of the positioning aids displaceable in guide rails, a stacking table can always only be used after retrofitting the positioning aids for producing one kind of transformer core. If different kinds of transformer cores are to be produced using one installation, a correspondingly large number of stacking tables is required for core shapes outside of the displacement ranges of the positioning aids which have to be held available.

SUMMARY OF THE INVENTION

The object of the invention at hand is therefore to propose a device and a method for producing a transformer core which both enable a cost-effective production of transformer cores.

This object is attained by a device having the features of claim 1 and a method having the features of claim 14.

The device according to the invention for producing transformer cores comprises a retaining system having a stacking table for collecting sheets of metal from which a transformer core can be constructed and having at least two positioning aids for the sheets of metal, the stacking table forming a positioning surface for the positioning aids and being able to be equipped with the positioning aids, the stacking table and the positioning aids being realized such that a free positioning in conjunction with a location-independent fastening of the positioning aids within the positioning surface is possible, the device comprising a positioning system by means of which the positioning aids can be disposed on and/or removed from the stacking table.

According to the invention, the retaining system for fastening the positioning aids and/or the threading bolts and/or the sheet-metal abutments on the stacking table is realized such that a free positioning and a location-independent fastening of the positioning aids in any position of the positioning surface becomes possible. The position of the positioning aids is therefore no longer bound to the fastening positions intended on the stacking table or to a fastening roster, whereby a flexible and arbitrary disposition of the positioning aids on the stacking table is possible, the disposition of the positioning aids being adapted to the geometry of the transformer core to be produced. Furthermore, the device has a positioning system by means of which the positioning aids can be disposed on and/or removed from the positioning surface. Owing to the possibility of being able to dispose the positioning aids on the stacking table or rather on the positioning surface of the stacking table by means of the positioning system, it becomes possible to construct stacking tables as required for different core sizes and different kinds of core shapes. Unlike with the generic, restrictedly adjustable, location-dependent fastening of the positioning aids, these stacking tables no longer have to be stored in large numbers since the stacking tables can be equipped with the positioning aids via the positioning system directly before stacking a transformer core. After removing the finished transformer core from the stacking table, the positioning aids can be removed again from the stacking table by means of the positioning system and be re-positioned if necessary in order to construct a new transformer core having a deviating shape. Hence producing different transformer cores becomes possible using only one stacking table. In this manner, the number of stacking tables can be drastically reduced, retrofitting efforts for positioning aids are lowered, and the costs for producing different transformer cores is drastically reduced.

Advantageously the positioning system can comprise a multiaxial robot. The positioning system can also be realized by the multiaxial robot. Threading bolts and/or sheet-metal abutments can be simply disposed on the stacking table in an automated manner by means of the robot. These positioning aids can also be removed from the stacking table by means of the robot.

As positioning aids for the sheets of metal, the retaining system can comprise a threading bolt which can be positioned within the positioning surface; a sheet-metal abutment for laterally stacking sheets of metal; a substruction which is intended for stacking the sheets of metal and can be positioned within the positioning surface; and/or a superstruction for covering the sheets of metal. The retaining system can also comprise several threading bolts, sheet-metal abutments, substructions and superstructions. In general, these elements of the retaining system can be disposed manually. A disposition is particularly simple owing to the threading bolts already fastened on the positioning surface.

The threading bolt on the stacking table, the sheet-metal abutment on the stacking table, the substruction on the stacking table, and/or the superstruction on the sheets of metal can be positioned and/or removed by means of the positioning system. The positioning system or rather the robot can also be used for disposing and deconstructing these components of the retaining system so that the stacking table can be constructed and deconstructed in a fully automated manner by means of the robot.

The positioning system can comprise a magazine having threading bolts, sheet-metal abutments, substructions and/or superstructions. If the positioning system comprises a robot, the robot can use these components for constructing the retaining system. A number of different threading bolts, sheet-metal abutments, substructions and/or superstructions can be stored in the magazine so that different retaining systems can be constructed in an automated manner. The magazine is then preferably positioned adjacent to the robot, making it possible to directly access the magazine or rather the components contained therein.

It is particularly advantageous if the positioning aids or rather the threading bolts are each formed having a retaining device for fastening the threading bolts on the positioning surface. If the retaining system comprises sheet-metal abutments and substructions, they can also each be equipped with a retaining device. The retaining device is preferably realized such that the location-independent fastening of the threading bolts on the positioning surface becomes possible. The exemplary threading bolt and/or sheet-metal abutment comprise(s) the retaining device so the retaining device can be an integral component of the threading bolt. It is essential that the retaining device enables a quick and location-independent fastening of the threading bolt on the positioning surface.

For fastening the positioning aids and/or the threading bolts and/or the sheet-metal abutments to the positioning surface, the retaining device can have a magnetic clamping unit, a vacuum clamping unit or a mechanical clamping unit. Thus the threading bolt itself can muster the retaining force required for being fastened to the positioning surface.

The magnetic clamping unit can comprise an accumulator and a coil. The accumulator can be a battery, with the coil serving to form a magnetic field. The coil can be part of an electromagnet, for example, by means of which a retaining force for fastening the threading bolt and/or the sheet-metal abutment can be mustered on the positioning surface. The positioning surface is preferably made of a magnetic material, such as steel. The coil can also be part of an electric motor by means of which a permanent magnet can be positioned relative to the positioning surface. It is further possible to position an electromagnet relative to the positioning surface in conjunction with an electric motor and to subsequently form a magnetic field. Changing the magnetic field by reversing the polarity of the electromagnet or the coil can also be intended.

The vacuum clamping unit can comprise a vacuum pump and/or a vacuum accumulator. The vacuum pump can be integrated in the threading bolt, the sheet-metal abutment and/or the retaining device. By means of the vacuum pump which can be powered using a battery, a vacuum can be realized between the retaining device and the positioning surface and thus causes a retaining force and therefore a fastening of the exemplary threading bolt. Alternatively or additionally, a vacuum accumulator can be provided in the retaining device which can be used for generating the vacuum, e.g., by simply opening a valve. At any rate, the vacuum can always be reversed by opening a valve so the threading bolt can be easily removed from the positioning surface. The vacuum clamping device or the retaining device can also have sealing lips which facilitate generating a vacuum between the positioning surface and the retaining device. Furthermore, pressure monitors or pressure sensors of the vacuum clamping unit can monitor a pressure of the vacuum in order to actuate the vacuum pump when pressure rises over a longer period of time or to use the vacuum accumulator for correcting pressure.

The retaining device can comprise an energy storage for forming a retaining force. The energy storage can be an accumulator or a battery or, if the retaining device is a vacuum clamping unit, a vacuum accumulator. The energy storage can be easily charged if the retaining device and/or the exemplary threading bolts is/are stored in a magazine.

In another embodiment, the stacking table can comprise a magnetic clamping plate or a vacuum clamping plate which forms the positioning surface. These clamping plates can be set up modularly so that the positioning surface can be made up of a plurality of clamping plates, for example. With reference to the embodiments of the magnetic clamping unit and vacuum clamping unit mentioned above, the stacking table can be realized like a magnetic clamping unit or a vacuum clamping unit. The stacking table can consequently comprise an energy storage. Ergo, the stacking table can comprise a vacuum accumulator or a vacuum pump. The energy storage of the stacking table can always be charged when the stacking table is positioned stationary in the scope of a work step.

It is advantageous if the positioning surface is entirely flat. If a magnetic clamping plate forms the positioning surface, the stacking table or rather the positioning surface can be made up of a disposition of poles which are disposed at a distance to one another through gaps. A flat positioning surface always enables arbitrarily disposing threading bolts on the positioning surface.

The device can have a plurality of stacking tables which can be moved in an automated manner. The stacking tables can be self-propelling so that the stacking tables can move between work stations autonomously. The stacking tables can be designed like a cart or be transported by a cart and have wheels and a drive. The stacking tables can freely move on a surface or in set tracks, e.g., move on rails connecting work stations.

In the method according to the invention for producing transformer cores by means of a device, sheets of metal from which a transformer core is constructed are placed on a stacking table of a retaining system of the device and by means of at least two positioning aids of the retaining system for the sheets of metal, the stacking table forming a positioning surface for the positioning aids and being equipped with the positioning aids which are freely positioned on the stacking table within the positioning surface and are fastened there independently of location, the positioning aids being disposed on and/or removed from the stacking table by means of a positioning system of the device. The description of advantages of the device according to the invention is referred to for the advantages of the method according to the invention.

A position of the positioning aids and/or the threading bolts and/or the sheet-metal abutments within the positioning surface can be determined by means of a control device of the device as a function of a shape of the transformer core to be produced. The control device can have means for data processing, such as a computer, and/or be a stored program control (SPC). The shape of the transformer core to be produced can be yielded from the desired physical properties and the measurements to be derived therefrom which can be determined or calculated using a core configurator for transformer cores. The core configurator can be, in particular, a software. In the same manner, measurements for sheets of metal of the transformer core can be derived from the core configurator and can be used by the control device for calculating a position of the threading bolts and/or sheet-metal abutments within the positioning surface. The control device can then determine exact positions for the threading bolts within the positioning surface.

Control commands can be transmitted to the control device by a control system of an installation for producing transformer cores as a function of component data describing a transformer core. The control system can comprise the core configurator, for example. It can be further intended for the control system to control the entire installation for producing transformer cores. The component data of a transformer core available in the control system can be converted to control commands which are transmitted to the control device. The control system can already determine or calculate the positions of the threading bolts and/or the sheet-metal abutments on the positioning surface and transmit control commands to the control device to equip a stacking table with exemplary threading bolts in the calculated positions. The control system can also have means for data processing, such as a computer with software.

The positioning of positioning aids and/or threading bolts and/or sheet-metal abutments on the stacking tables, the storage positions intended for the respective sheets of metal and disposed adjacent to the positioning system, and/or a cutting sequence of a cutting device for sheets of metal can be identified by means of the control system. It is then also possible, for example, to co-ordinate the different work stations of the installation for producing transformer cores with one another by means of the control system so that an optimal material flow with little processing time can be realized. The cutting frequency of a cutting device for sheets of metal can be adapted to an amount of sheets of metal in storage positions at a robot, for example, so that a sufficient amount of sheets of metal is always available in the storage positions. Furthermore, the stacking tables can be equipped with exemplary threading bolts in such a manner that certain kinds of transformer cores can be produced as a function of material flow. If steel-strip rolls required for producing a transformer core are no longer available, for example, the control system can initiate the production of other transformer cores for which enough material is available. The control system can transmit control commands to the control device to retrofit stacking tables and initiate producing and providing corresponding sheets of metal.

The positioning aids can be disposed on and/or removed from the stacking table within the positioning surface in an automated manner by means of the determined position of the positioning aid.

The positioning aids and/or the threading bolts and/or the sheet-metal abutments on the stacking table can be positioned and/or removed by means of a multiaxial robot of the positioning system, the robot stacking the sheets of metal on the positioning aids after positioning the positioning aids. All in all, only one robot is required in order to equip the stacking table with threading bolts and/or sheet-metal abutments and to subsequently construct the transformer core by stacking the sheets of metal on the positioning aids. The robot can then always first construct the stacking table having threading bolts, for example, before stacking the sheets of metal so different transformer cores can be constructed one after the other using one and the same robot. Thereby, producing transformer cores becomes particularly flexible and cost-efficient.

In another embodiment of the method, the positioning aids and/or the threading bolts and/or the sheet-metal abutments can be positioned on and/or removed from the stacking table by means of a multiaxial robot of the positioning system, a further multiaxial robot being able to stack sheets of metal on the positioning aids after positioning the positioning aids. All in all, two robots can thus be used for producing transformer cores, the further robot only serving for constructing stacking tables and the robot serving only for stacking the sheets of metal on the exemplary threading bolts. This makes it possible to equip a large number of stacking tables with threading bolts in a short amount of time and/or to remove the threading bolts from the stacking table, stacking the sheets of metal on the threading bolts using the robot no longer being interrupted by disposing threading bolts on the stacking tables. All in all, transformer cores can thus be produced particularly quick and consequently cost-efficiently.

Moreover, it is possible to construct a plurality of transformer cores on one stacking table. In particular if a control system for an installation for producing transformer cores is available, this control system can calculate an optimal distribution of transformer cores on a stacking table.

The positioning aids and/or the threading bolts and/or the sheet-metal abutments can each comprise a transponder, a transmitter-receiver unit of a retaining system being able to identify the positioning aids by means of the transponder. The transponder can be an RFID transponder, for example. In the transponder, an individual code can be stored which enables allocating or rather undoubtedly identifying the exemplary threading bolts. By undoubtedly identifying the threading bolts, handling the threading bolts by means of a robot in an automated manner is significantly facilitated and mistakes are avoided. The transmitter-receiver unit can be disposed on the robot and/or on a stacking table. Furthermore, the transponder can also store data describing the threading bolts and transmit them to the transmitter-receiver unit. A particular allocation of the transponder and/or the threading bolt is then no longer necessary. The transponder can be a passive transponder but also an active transponder, a mutual exchange of data being able to be carried using the transmitter-receiver unit. It then becomes possible to transmit control commands to the transponder and inquire status notifications from the transponder.

Consequently, the retaining system can communicate with the transponders, a fastening or a removal of the positioning aids on the positioning surface being able to be effected by means of a holding device of the positioning aids and/or the threading bolts and/or the sheet-metal abutments. A control command can be transmitted from a control device, for example, to the retaining device via the transponder, the control command causing the fastening or removal of the exemplary threading bolt on the positioning surface. Thus it is possible, for example, to initiate operation of a vacuum pump in order to fasten the threading bolt on the positioning surface by means of a vacuum or to initiate opening a valve for reversing the thus generated vacuum and for enabling removing the threading bolt from the positioning surface. A point in time of an actual fastening of the threading bolt on the positioning surface is generally arbitrary. Since the threading bolts have a comparatively large deadweight, the threading bolts can be freely positioned on the positioning surface at first by means of the robot, the threading bolts being able to be actually fastened by forming a supplementary fastening force only if a stacking of the sheets of metal on the threading bolt is imminent.

Further advantageous embodiments of the method are derived from the features of the dependent claims referring to claim 1.

BRIEF DESCRIPTION OF THE DRAWING FIGURES

In the following, an embodiment of the invention is further described with reference to the attached drawing.

DETAILED DESCRIPTION OF THE INVENTION

Figure 1:
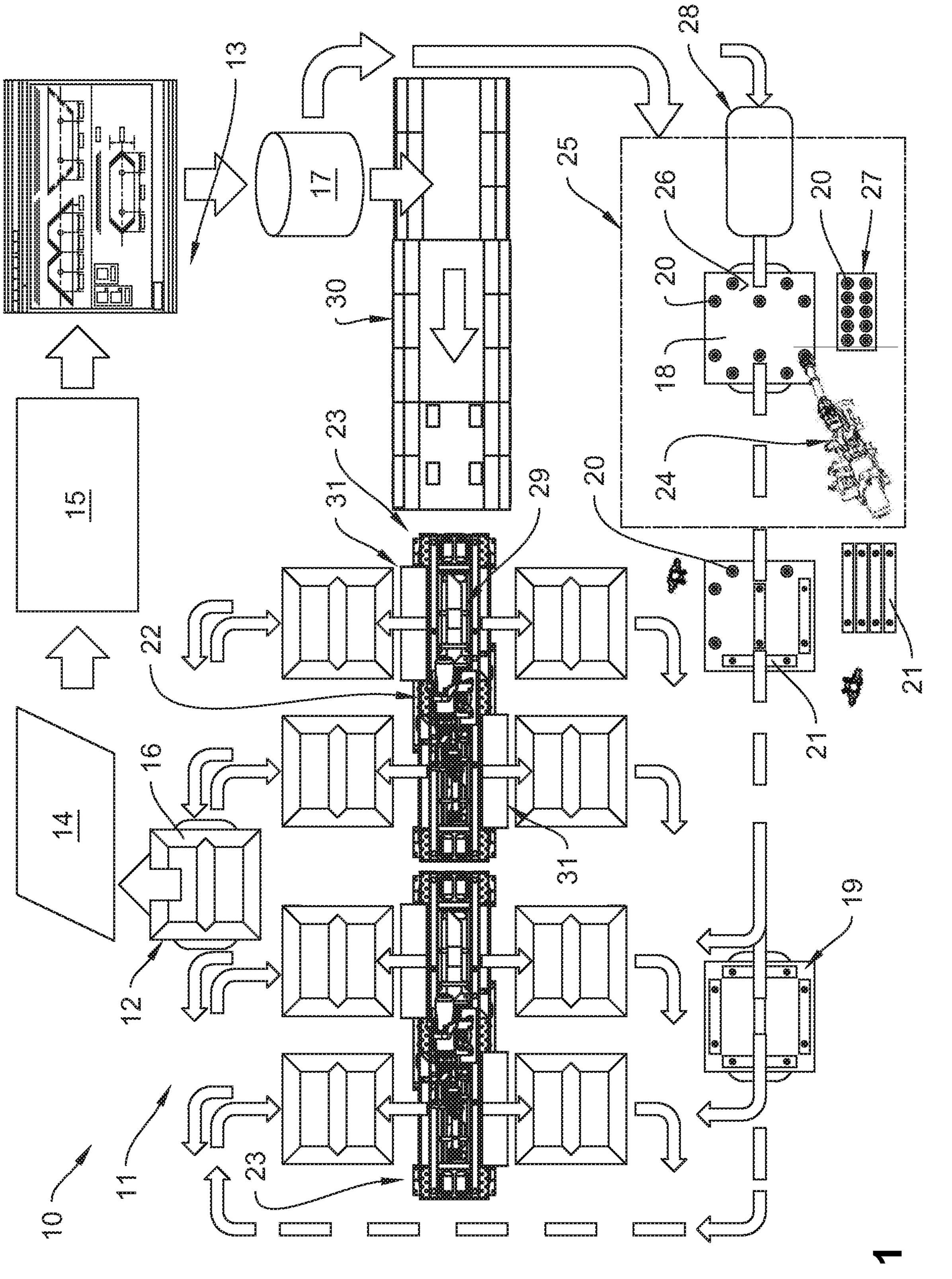
FIG. 1 shows a schematic view of an installation for producing transformer cores.

FIG. 1 shows a schematic illustration of an installation 10 having a device 11 for producing transformer cores 12. Installation 10 comprises a control system 13 which serves for controlling installation 10. Component data 14 describing transformer cores 12 are processed using control system 13 by means of a so-called core configurator 15 so sheets of metal 16 from which transformer core 12 is constructed are calculated using their measurements. Control system 13 transmits control commands and/or data for producing transformer core 12 to a control device 17 which then initiates producing transformer core 12 using corresponding control commands.

Device 11 comprises among other elements a number of stacking tables 18 having a retaining system 19 for collecting sheets of metal 16. Retaining system 19 comprises at least two threading bolts 20 and, in this shown embodiment, substructions 21 for placing sheets of metal 16. Sheets of metal 16 are realized having bores not illustrated in this instance and are placed and/or inserted on threading bolts 20. Sheets of metal 16 are placed on threading bolts 20 or rather on stacking table 18 by means of a robot 22 of a robot system 23. Threading bolts 20 are also positioned on a positioning surface 26 of stacking table 18 by means of a robot 24 of a positioning system 25. Positioning surface 26 is flat so a free positioning and a location-independent fastening of threading bolts 20 on positioning surface can be effected according to the specifications of control system 13. Threading bolts 20 are stored in a magazine 27 and are disposed on or removed from positioning surface 26 by means of robot 24. For this purpose, stacking table 18 is transported by means of a self-propelling cart 28. Cart 28 transports stacking table 18 to illustrated robot systems 23 at which stacking table 18 is equipped with sheets of metal 16 or rather sheets of metal 16 are stacked to construct transformer core 12. After transformer core 12 has been stacked, stacking table 18 is transported away from robot system 23 by cart 28.

A number of sheets of metal 16 is supplied to robot systems 23 from a cutting device 30 by means of a conveyor device 29 and are stacked adjacent to respective robot 22 in two storage positions 31 for different sheets of metal 16 in each instance. Robot 22 and/or storage position 31 is/are also controlled by means of control device 17. Robot 22 grapples sheets of metal 16 from respective storage positions 31 and positions them on threading bolts 20 on stacking table 18 until transformer core 12 is constructed. Robot 22 can be displaced above conveyor device 29 so that robot 22 can equip four stacking tables 18 with sheets of metal 16 simultaneously.

Only schematically illustrated cutting device 30 serves for cutting sheets of metal 16 and is controlled by control device 17. In cutting device 30, not-illustrated sheet-metal strips are cut such that sheets of metal 16 are yielded. Not-illustrated sheet-metal strips are supplied from steel-strip rolls to cutting device 30.

Figure 2:
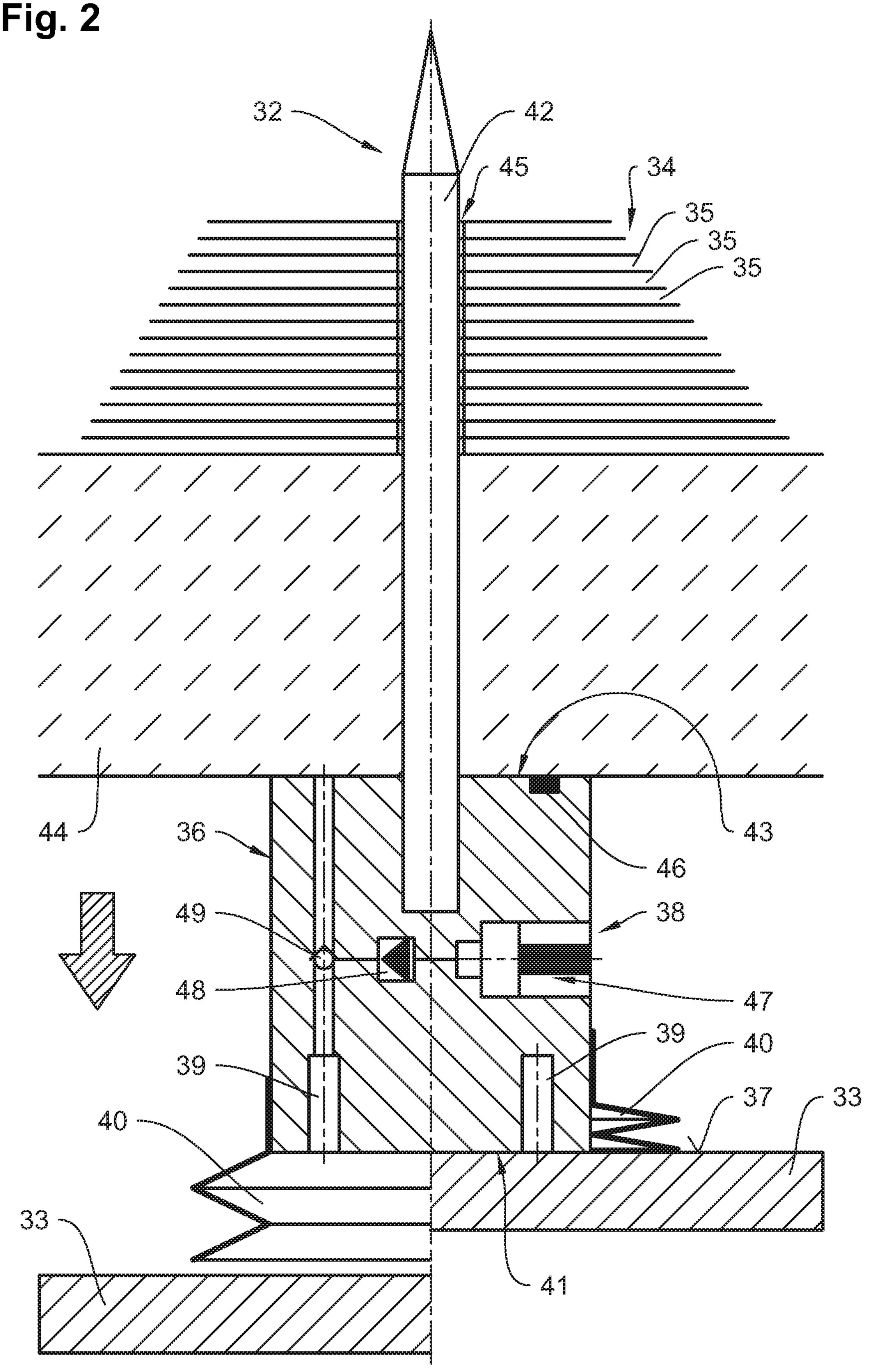
FIG. 2 shows a longitudinal cross section of an embodiment of a threading bolt.

FIG. 2 shows in a longitudinal cross section an embodiment of a threading bolt 32 having a stacking table 33 and a sheet-metal stack 34 of sheets of metal 35 for producing a transformer core. Threading bolt 32 is realized having a retaining device 36 for fastening threading bolt 32 on a positioning surface 37 of stacking table 33. Retaining device 36 has a vacuum clamping unit 38 having a not further illustrated vacuum pump. Retaining device 36 further has an annular channel 39, in which a vacuum can be generated, and a rubber bellows 40 so a lower side 41 of retaining device 36 can be fastened on positioning surface 37 in a sealing manner by means of a retaining force generated by the vacuum. A bolt 42 of threading bolt 32 is disposed in a fixed manner on retaining device 36, a substructure 44 being placed on an upper side 43 of retaining device 36 for placing sheets of metal 35. Sheets of metal 35 all have a bore 45 which each enable an exact positioning of sheets of metal 35 on bolt 42 of threading bolt 32.

Retaining device 36 further has an RFID transponder 46 available for identifying threading bolt 32 as well as a further transponder 47 by means of which control commands of not-illustrated control device can be received. By means of a drive 48, a check valve 49 can be actuated via transponder 47 so that the vacuum generated in annular channel 39 can be reversed by supplying ambient air. Removing threading bolt 32 from stacking table 33 can thus be carried out easily.

Figure 3:
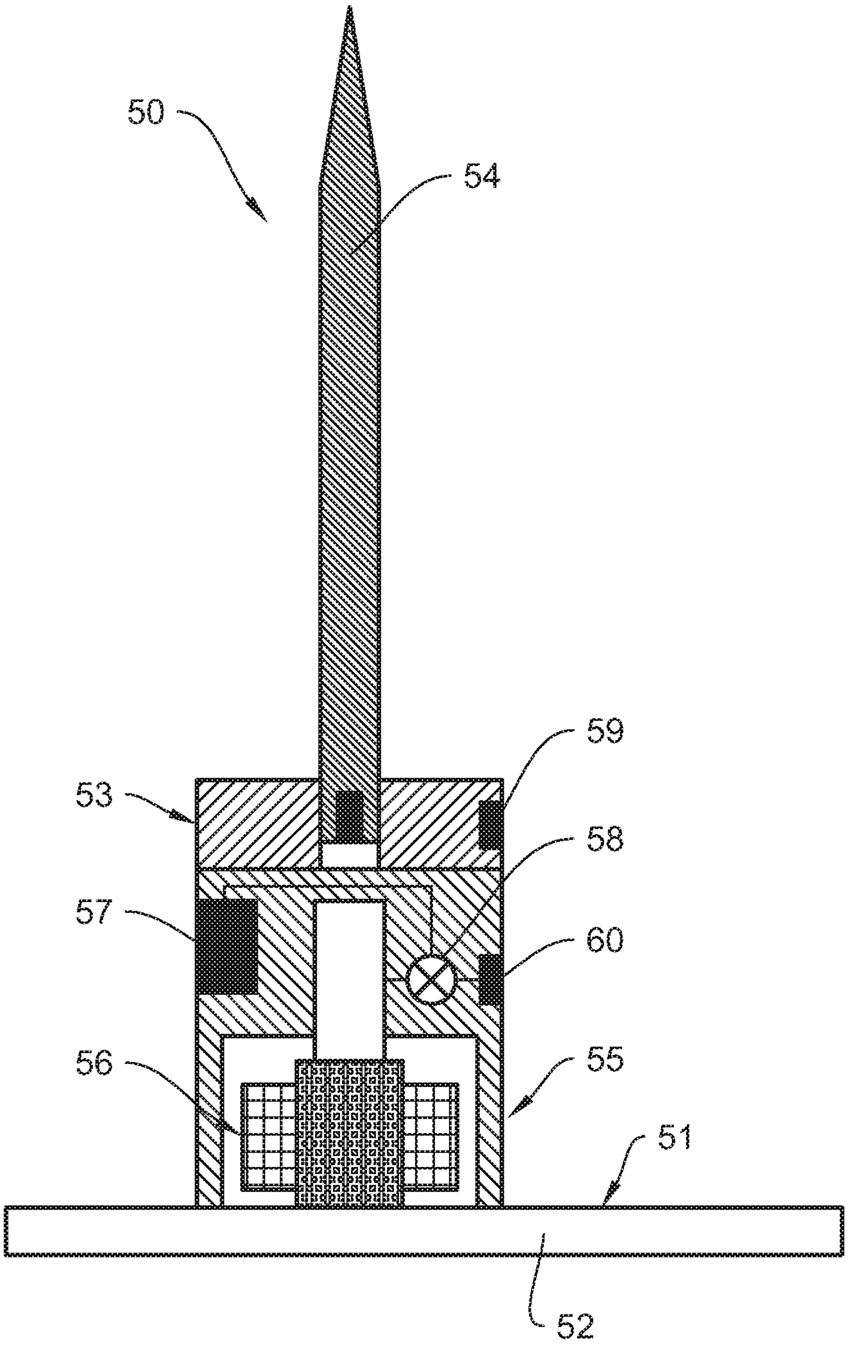
FIG. 3 shows a longitudinal cross section of a further embodiment of a threading bolt.

FIG. 3 shows in a cut view another embodiment of threading bolt 32 on a positioning surface 51 of a stacking table 52. Threading bolt 50 comprises a retaining device 53 having a bolt 54 disposed thereon for collecting not-illustrated sheets of metal of a transformer core. The retaining device is realized as a magnetic clamping unit 55 having an electromagnet 56. Electromagnet 56 is powered via an accumulator 57 and can be displaced by means of a drive 58 relative to positioning surface 51. For identifying threading bolt 50, it further comprises an RFID transponder 59. Via a transponder 60, receiving control signals of a not-illustrated control device for actuating retaining device 53 is possible.

The invention claimed is:

1. A device (11) for producing transformer cores (12), the device comprising a retaining system (19) having a stacking table (18, 33, 52) for collecting sheets of metal (16, 35) from which a transformer core is formed and having at least two positioning aids for the sheets of metal, the stacking table forming a positioning surface (26, 37, 51) for the positioning aids and being equipped with the positioning aids, wherein the stacking table and the positioning aids are adapted to allow free positioning and location-independent fastening of the positioning aids within the positioning surface at any position within the positioning surface, the device having a positioning system (25) including a multiaxial robot (24), the multiaxial robot adapted to automatically position the positioning aids on the stacking table and is further adapted to automatically remove the positioning aids from the stacking table.

2. The device according to claim 1, characterized in that as positioning aids for the sheets of metal, the retaining system (19) has a threading bolt (20, 32, 50) which can be positioned within the positioning surface (26, 37, 51); a sheet-metal abutment for laterally contacting the sheets of metal (16, 35); a substruction (21) which can be positioned within the positioning surface and serves for stacking the sheets of metal; and/or a superstruction for covering the sheets of metal.

3. The device according to claim 2, characterized in that by means of the positioning system (25), the threading bolt (20, 32, 50), the sheet-metal abutment and the substruction (21) can be positioned on and/or removed from the threading table (18, 33, 52) and/or the superstruction can be positioned on and/or removed from the sheets of metal (16, 35).

4. The device according to claim 2, characterized in that the positioning system (25) has a magazine (27) having threading bolts (20, 32, 50), sheet-metal abutments, substructions (21) and/or superstructions.

5. The device according to claim 1, characterized in that the positioning aids are each realized having a retaining device (36, 53) for fastening the positioning aids on the positioning surface (26, 37, 51).

6. The device according to claim 5, characterized in that the retaining device (36, 53) comprises a magnetic clamping unit (55), a vacuum clamping unit (38) or a mechanical clamping unit for fastening the positioning aid on the positioning surface (26, 37, 51).

7. The device according to claim 6, characterized in that the magnetic clamping unit (55) has an accumulator (57) and a coil.

8. The device according to claim 6, characterized in that the vacuum clamping unit (38) comprises a vacuum pump and/or a vacuum accumulator.

9. The device according to claim 5, characterized in that the retaining device (36, 53) comprises an energy storage for forming a retaining force.

10. The device according to claim 1, characterized in that the stacking table (18, 33, 52) comprises a magnetizable clamping plate or a vacuum clamping plate which forms the positioning surface (26, 37, 51).

11. The device according to claim 1, characterized in that the positioning surface (26, 37, 51) is entirely flat.

12. The device according to claim 1, characterized in that the device (11) has a plurality of stacking tables (18, 33, 52) which can be moved in an automated manner.

13. A method for producing transformer cores (12) using a device (11), sheets of metal (16, 35) from which a transformer core is constructed being collected on a stacking table (18, 33, 52) of a retaining system (19) of the device and by means of at least two positioning aids of the retaining system for the sheets of metal, the stacking table forming a positioning surface (26, 37, 51) for the positioning aids and being equipped with the positioning aids, wherein the positioning aids are adapted to be freely positioned and fastened independently of location at any position within the position surface, the positioning aids being disposed on or removed from the stacking table by means of a positioning system (25), wherein the positioning system includes a multiaxial robot adapted to automatically position the positioning aids on the position surface and remove the positioning aids from the position surface.

14. The method according to claim 13, characterized in that a position of the positioning aids within the positioning surface (26, 37, 51) is determined by means of a control device (17) of the device as a function of a shape of the transformer core (12) to be produced.

15. The method according to claim 14, characterized in that control commands are transmitted to the control device from a control system (13) of an installation (10) for producing transformer cores (12) as a function of component data describing a transformer core.

16. The method according to claim 15, characterized in that the positioning of positioning aids on the stacking tables (18, 33, 52), storage positions (31) adjacent to the positioning system (25) and intended for the respective sheets of metal, and/or a cutting sequence of a cutting device (30) for sheets of metal are determined by means of the control system (13).

17. The method 13, characterized in that the positioning aids are disposed on and/or removed from the stacking table (18, 33, 52) in an automated manner within the positioning surface (26, 37, 51) by means of the determined position of the positioning aids.

18. The method according to 13, characterized in that the positioning aids are positioned on and/or removed from the stacking table (18, 33, 52) by means of a multiaxial robot of the positioning system, the robot stacking the sheets of metal (16, 35) on the positioning aids after positioning the positioning aids.

19. The method according to claim 13, characterized in that the positioning aids are positioned on and/or removed from the stacking table (18, 33, 52) by means of a multiaxial robot (24) of the positioning system, a further multiaxial robot (22) stacking the sheets of metal (16, 35) on the positioning aids after positioning the positioning aids.

20. The method according to claim 13, characterized in that a plurality of transformer cores (12) are constructed on one stacking table (18, 33, 52).

21. The method according claim 13, characterized in that the positioning aids each have a transponder (46, 47, 59, 60), a transmitter-receiver unit of a retaining system (19) identifying the positioning aids by means of the transponder.

22. The method according to claim 21, characterized in that the retaining system (19) communicates with the transponders (46, 47, 59, 60) in such a manner that a fastening or loosening of the positioning aids on the positioning surface (26, 37, 51) is caused by means of a retaining device (36, 53) of the positioning aids.

23. A device (11) for producing transformer cores (12), the device comprising:

a retaining system (19) having a stacking table (18, 33, 52) for collecting sheets of metal (16, 35) from which a transformer core is formed and having at least two positioning aids for the sheets of metal, the stacking table forming a positioning surface (26, 37, 51) for the positioning aids and being equipped with the positioning aids, and a positioning system (25) including a multiaxial robot (24), said multiaxial robot adapted to freely position and fasten the positioning aids on the stacking table in a location-independent manner.

24. A method for producing transformer cores (12) using a device (11) comprising the steps of:

providing a retaining system (19) including a stacking table (18, 33, 52), the stacking table forming a positioning surface (26, 37, 51);

providing a positioning system (25) including a multiaxial robot (24);

adding at least two positioning aids to the positioning surface with the multiaxial robot, including freely positioning and fastening said positioning aids to the positioning surface in a location-independent manner; and collecting and stacking sheets of metal (16, 35) to form the transformer core on the stacking table (18, 33, 52).

* * * * *